Aug. 13, 1940.   E. B. HUDSON   2,211,657
STRIP GAUGING DEVICE
Filed March 14, 1938   3 Sheets-Sheet 1
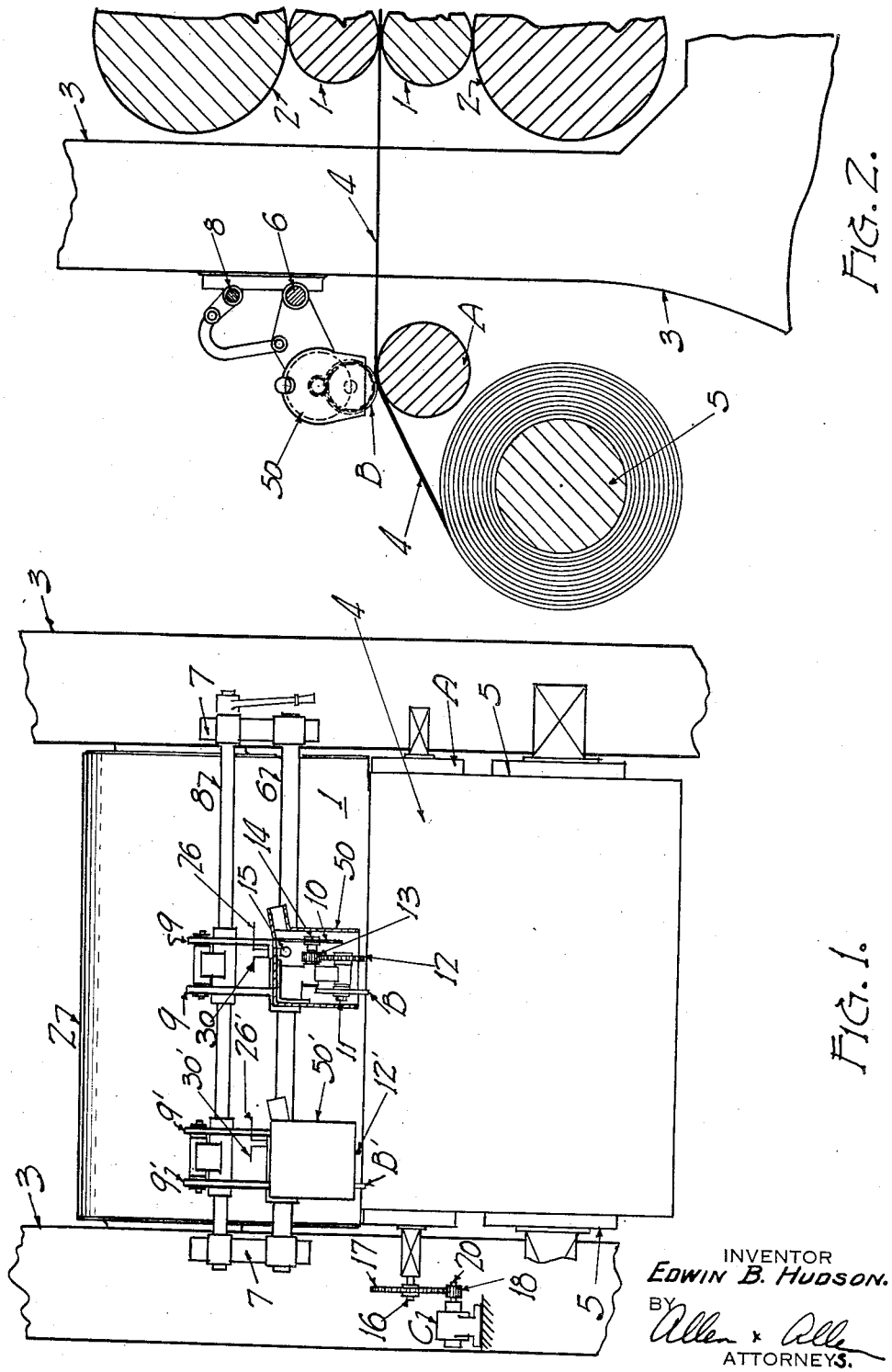
INVENTOR
EDWIN B. HUDSON.
BY
Allen & Allen
ATTORNEYS.

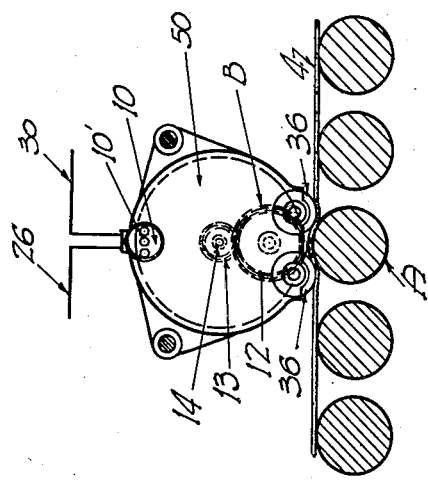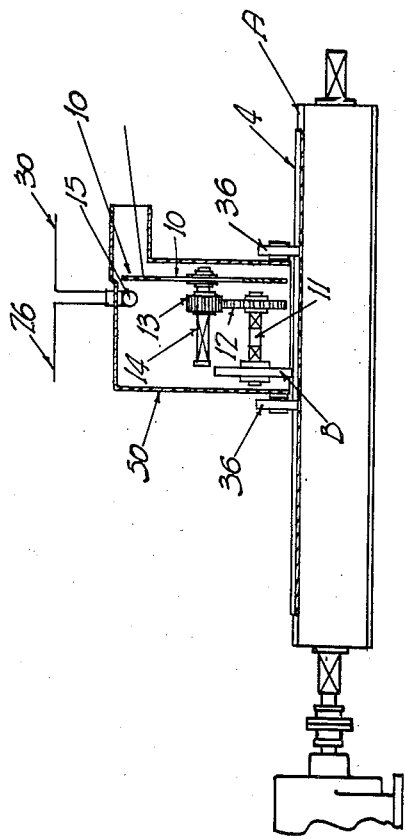

Aug. 13, 1940.  E. B. HUDSON  2,211,657
STRIP GAUGING DEVICE
Filed March 14, 1938  3 Sheets-Sheet 3

INVENTOR
EDWIN B. HUDS
BY
ATTORNEYS.

Patented Aug. 13, 1940

2,211,657

UNITED STATES PATENT OFFICE 2,211,657

STRIP GAUGING DEVICE

Edwin B. Hudson, Middletown, Ohio, assignor to The American Rolling Mill Company, Middletown, Ohio, a corporation of Ohio Application March 14, 1938, Serial No. 195,839

4 Claims. (Cl. 177—311)

This invention relates to gauging devices and more particularly to devices for gauging or indicating the thickness of a strip of metal being delivered from a cold reduction mill or on the delivery tables of a hot strip mill.

It is well known that the surface speed of a cylinder or disc or the like, is greater than the linear speed of any other point on such disc or cylinder at any angular velocity. It is an object of my invention to utilize this principle in gauging the thickness of a strip of metal by causing said strip of metal to be snugly wrapped about an arc of a cylinder and making noticeable any change in the differential of linear speeds between the inner and outer surfaces of said strip. It is another object of my invention to provide a device as outlined above in which interchangeable parts will be provided for various desired strip thicknesses, said parts being so designed as to produce a neutral indication upon an indicating instrument so long as the strip thickness adheres to a certain standard and which will give a qualitative indication as to whether the strip thickness is too great or too small.

It is also an object of my invention to provide means to indicate the relative thickness of the center of the strip with respect to the edge. By providing a second gauging unit located near the edge of the strip and operating from the same electrical circuit and having wheels B and B' of the same diameters, the cross section of the strip can be rolled flat, as this arrangement indicates the relative thickness of the edge and center. Should it be desirable to roll strip of a given difference in thickness between edge and center, then it is only necessary to provide wheels B and B' which indicate such difference.

It is another object of my invention to provide such a strip gauging device which will be simple in operation and highly sensitive to small variations in gauge of the strip.

These and other objects of my invention which will be apparent to one skilled in the art upon reading these specifications or which will be pointed out more specifically hereinafter, I accomplish by that certain construction and arrangement of parts of which I shall now describe certain exemplary embodiments. Reference is made to the drawings forming a part hereof and in which:

Figure 1 shows the installation of the gauge at the center of the strip and also at the edge indicating the relative fullness of the strip contour.

Fig. 2 shows a side elevation of the strip gauge installation.

Fig. 3 shows a cross section of a hot mill runout table on which the gauge is installed.

Fig. 4 shows a side elevation of the gauge in Fig. 3.

Figure 5:
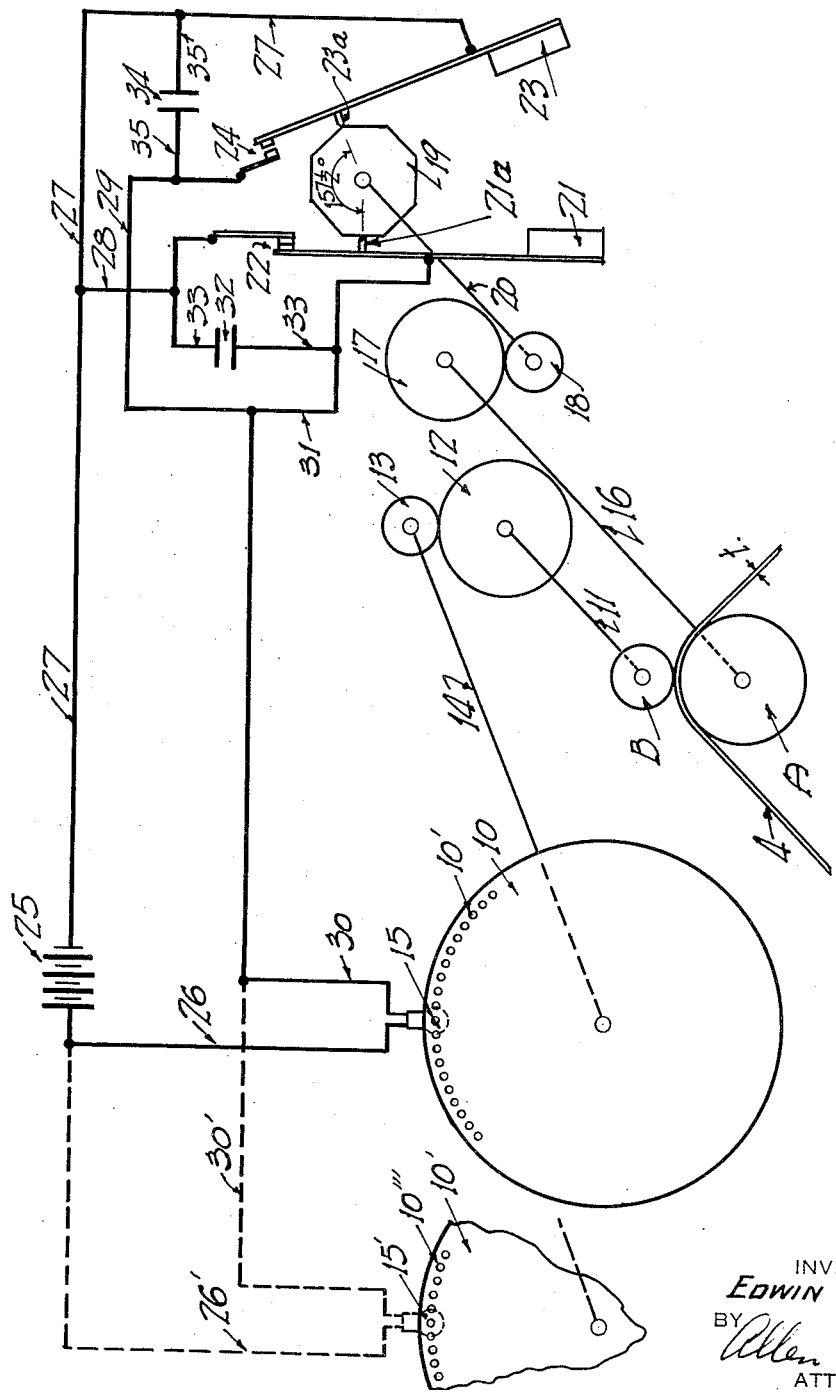
Fig. 5 shows the wiring diagram.

Briefly, in the practice of my invention, I provide a cylinder and cause the strip to follow the surface of said cylinder snugly about a slight arc. I provide a disc to ride upon the strip opposite said cylinder and I provide means preferably whereby the disc is caused to rotate at the same speed as the cylinder or at twice the speed of the cylinder when the desired strip thickness is being produced.

Assuming the diameter of the cylinder to be A, and the diameter of the disc to be B, and the thickness to be produced in the strip to be $t$, it will be clear that if $B = A + 2t$, then the disc will rotate at the same speed as the cylinder when the thickness $t$, is being attained. It will also be clear that if $$B = \frac{A}{2} + t$$

then the disc will be caused to rotate twice as fast as the cylinder.

The cylinder and the disc are connected by means of mechanism to be described respectively to an annularly perforated disc and a make and break device, said make and break device being connected to a neon light aligned with the perforations in said disc. From the foregoing, it will be clear that the strip thickness may be visually determined by virtue of the stroboscopic effect which will be produced and that so long as the strip thickness remains constant the perforations in the disc will appear to stand still. A variation from the predetermined thickness in one sense or the other will, of course, produce an apparent clockwise or counterclockwise rotation of the perforations. On the basis of such apparent movement, the roller will make appropriate mill screw adjustments to bring the perforations to an apparent standstill.

In Figure 2, I have shown diagrammatically, a four-high rolling mill having working rolls 1, and backing rolls 2, which are mounted in mill housings 3 (see Figure 1), and operating upon a strip of metal 4, which is being coiled upon a coiler 5. Intermediate the working rolls 1, and the coiler 5, I provide a cylinder A which is so disposed that the strip 4 will be caused to follow around an arc of the cylinder. Immediately opposite the cylinder A, I provide a disc B. This disc is mounted in a housing generally indicated at 50, and the housing is supported upon the shaft 6, which is mounted in bearing 7 in the mill housing 3. The member 50 is connected to the shaft 8, which is mounted similarly to the shaft 6, by means of a linkage 9 so that when the shaft 8, in Figure 2, is rotated in a clockwise direction about 100°, the housing 50 and the disc B, will be raised from the strip to permit threading of the mill and the coiler.

It will now be clear that the strip thickness will increase the effective radius of the cylinder A and that the disc B will rotate faster in relation to the cylinder A when the strip 4 is thicker, and slower when the strip 4 is thinner. It is understood that a variety of discs B will be provided whose dimensions have been calculated to give the desired 1:1 or 1:2 ratio.

Referring now to Figure 5, a perforated disc 10 is driven from the disc B through the shaft 11, the gears 12 and 13 and the shaft 14. A neon light 15 is disposed in line with the perforations 10' on the disc 10. The neon light 15 is arranged to be periodically energized by a battery through a make and break device indicated generally at C in Figure 1.

The operation of this part of the device is as follows:

I provide an eight sided cam 19 which is driven from the cylinder A through the shaft 16, the gears 17 and 18, and the shaft 20. Two breakers are disposed in operative relation with the cam 19. These are indicated generally at 21 and 23 and may comprise strips of resilient metal solidly mounted at one end and having contact members 22 and 24 at their other ends. Intermediate their ends, the breakers are provided with cam followers 21a and 23a. These followers are spaced apart 157½°. Direct current is provided by the battery 25, one pole of which is connected to the neon light 15 as by lead 26. The other pole connected to a lead 27 supplies the breakers 21 and 23 through the parallel circuits 21 and 28. The other sides of the breakers 21 and 23 respectively, are parallel connected by the leads 29 and 31 and the common lead 30 to the other side of the neon light 15. The breakers 21 and 23 are respectively by-passed by the condensers 32 and 34 by means of the leads 33 and 35.

It will be noted that the breakers 21 and 23 operate alternately, the effect being the same as if the cam 19 were sixteen sided and there was a single follower. It is understood that the dimensions of the gears connecting the various driven parts will be calculated to give the proper stroboscopic effect when the strip thickness remains constant.

In Figures 3 and 4, I have shown a slight modification, somewhat diagrammatically in which the invention is applied to the hot mill runout table. The only difference here is, that two additional rolls 36 have been provided to cause the strip to conform to a small arc of the roll A.

It will be clear that various modifications will suggest themselves to those skilled in the arts and various minor changes may be made without departing from the spirit of my invention. I therefore, do not intend to limit myself in any manner other than is pointed out in the claims which follow.

Having now fully described my invention what I believe to be new and desire to secure by Letters Patent, is:

1. An apparatus for gauging the thickness of a strip of metal, comprising a cylinder around an arc of which said strip is adapted to pass, and a rotatable member having a circular periphery positioned to ride on said strip at a point at which the strip is in contact with said cylinder, the radius of said rotatable member being in a ratio of whole members to the sum of the radius of said cylinder and the intended strip thickness, and effectively continuous means for comparing the rotatative speeds of said cylinder and rotatable member.

2. An apparatus for gauging the thickness of a strip of metal, comprising a cylinder around an arc of which said strip is adapted to pass, and a rotatable member having a circular periphery positioned to ride on said strip at a point at which the strip is in contact with said cylinder, the radius of said rotatable member being equal to the sum of the radius of said cylinder and the intended strip thickness, and effectively continuous means for comparing the rotative speeds of said cylinder and rotatable member.

3. An apparatus for gauging the thickness of a strip of metal, comprising a cylinder around an arc of which said strip is adapted to pass, and a rotatable member having a circular periphery positioned to ride on said strip at a point at which the strip is in contact with said cylinder, the radius of said rotatable member being in a ratio of whole numbers to the sum of the radius of said cylinder and the intended strip thickness, and stroboscopic means for substantially continuously comparing the rotative speeds of said cylinder and rotatable member, said stroboscopic means being arranged to give a neutral indication when the intended strip thickness is being achieved.

4. An apparatus for gauging the thickness of a strip of metal, comprising a cylinder around an arc of which said strip is adapted to pass, and a rotatable member having a circular periphery positioned to ride on said strip at a point at which the strip is in contact with said cylinder, the radius of said rotatable member being equal to the sum of the radius of said cylinder and the intended strip thickness, and stroboscopic means for substantially continuously comparing the rotative speeds of said cylinder and rotatable member, said stroboscopic means being arranged to give a neutral indication when the intended strip thickness is being achieved.

EDWIN B. HUDSON.

CERTIFICATE OF CORRECTION.

Patent No. 2,211,657.　　　　　　　　　　　　　　　August 13, 1940.

EDWIN B. HUDSON.

It is hereby certified that error appears in the printed specification of the above numbered patent requiring correction as follows: Page 2, second column, line 18, claim 1, for the word "members" read --numbers--; and that the said Letters Patent should be read with this correction therein that the same may conform to the record of the case in the Patent Office.

Signed and sealed this 24th day of September, A. D. 1940.

(Seal)　　　　　　　　　　　　　　　　　　　　　　　　Henry Van Arsdale,
　　　　　　　　　　　　　　　　　　　　　　　　Acting Commissioner of Patents.